United States Patent
Oguro

(10) Patent No.: US 10,360,446 B2
(45) Date of Patent: Jul. 23, 2019

(54) DATA PROCESSING APPARATUS, STORAGE MEDIUM STORING PROGRAM, AND DATA PROCESSING METHOD

(71) Applicant: Brother Kogyo Kabushiki Kaisha, Nagoya-shi, Aichi-ken (JP)

(72) Inventor: Yuki Oguro, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 65 days.

(21) Appl. No.: 15/660,049

(22) Filed: Jul. 26, 2017

(65) Prior Publication Data

US 2018/0032810 A1 Feb. 1, 2018

(30) Foreign Application Priority Data

Jul. 29, 2016 (JP) ................................ 2016-149196

(51) Int. Cl.
| | |
|---|---|
| *G06K 9/00* | (2006.01) |
| *G06K 9/18* | (2006.01) |
| *G06K 9/20* | (2006.01) |
| *H04N 19/00* | (2014.01) |
| *H04N 19/12* | (2014.01) |
| *H04N 19/132* | (2014.01) |
| *H04N 19/184* | (2014.01) |

(Continued)

(52) U.S. Cl.
CPC ..... *G06K 9/00463* (2013.01); *G06K 9/00456* (2013.01); *G06K 9/18* (2013.01); *G06K 9/2063* (2013.01); *H04N 19/00* (2013.01); *H04N 19/12* (2014.11); *H04N 19/132* (2014.11); *H04N 19/167* (2014.11); *H04N 19/184* (2014.11); *H04N 19/59* (2014.11)

(58) Field of Classification Search
USPC ......................................................... 382/176
See application file for complete search history.

(56) References Cited

U.S. PATENT DOCUMENTS 9,948,824 B2 * 4/2018 Kamada ............... H04N 1/6027
2005/0180645 A1 8/2005 Hasegawa et al.
(Continued)

FOREIGN PATENT DOCUMENTS

JP 2005-259017 A 9/2005

*Primary Examiner* — Jerome Grant, II
(74) *Attorney, Agent, or Firm* — Banner & Witcoff, Ltd.

(57) ABSTRACT

A processor of a data processing apparatus performs: acquiring target image data that is generated by optically reading an original document; acquiring, by using the target image data, character region data and other-type region data, the character region data being indicative of a character region representing characters, the other-type region data being indicative of an other-type region different from the character region; generating first compressed data by performing a first compression process on the character region data; acquiring first character-recognized data including first character information that is generated by performing a character recognition process on the first compressed data; generating second compressed data by performing a second compression process on the other-type region data, the second compression process being different from the first compression process; and acquiring second character-recognized data including second character information that is generated by performing the character recognition process on the other-type region data.

20 Claims, 5 Drawing Sheets

(51) Int. Cl.
*H04N 19/167* (2014.01)
*H04N 19/59* (2014.01)

(56) References Cited

U.S. PATENT DOCUMENTS

| | | | | |
|---|---|---|---|---|
| 2007/0239947 A1* | 10/2007 | Li | ............ | G06F 3/0608 |
| | | | | 711/154 |
| 2009/0148003 A1* | 6/2009 | Chen | ............ | G06K 9/40 |
| | | | | 382/112 |
| 2009/0208144 A1* | 8/2009 | Lin | ............ | H04N 1/00236 |
| | | | | 382/321 |
| 2013/0198123 A1* | 8/2013 | Stadermann | ....... | G06K 9/00463 |
| | | | | 706/46 |
| 2016/0014296 A1* | 1/2016 | Saka | ............ | H04N 1/642 |
| | | | | 358/3.24 |
| 2016/0057305 A1* | 2/2016 | Suzuki | ............ | H04N 1/00912 |
| | | | | 358/1.13 |
| 2017/0249286 A1* | 8/2017 | Kaplan | ............ | G06F 17/214 |
| 2017/0278211 A1* | 9/2017 | Araki | ............ | G06F 21/30 |
| 2017/0346961 A1* | 11/2017 | Kopparthi | ............ | H04N 1/00328 |
| 2018/0032810 A1* | 2/2018 | Oguro | ............ | G06K 9/00463 |
| 2018/0182086 A1* | 6/2018 | Ma | ............ | G06T 7/0002 |

* cited by examiner

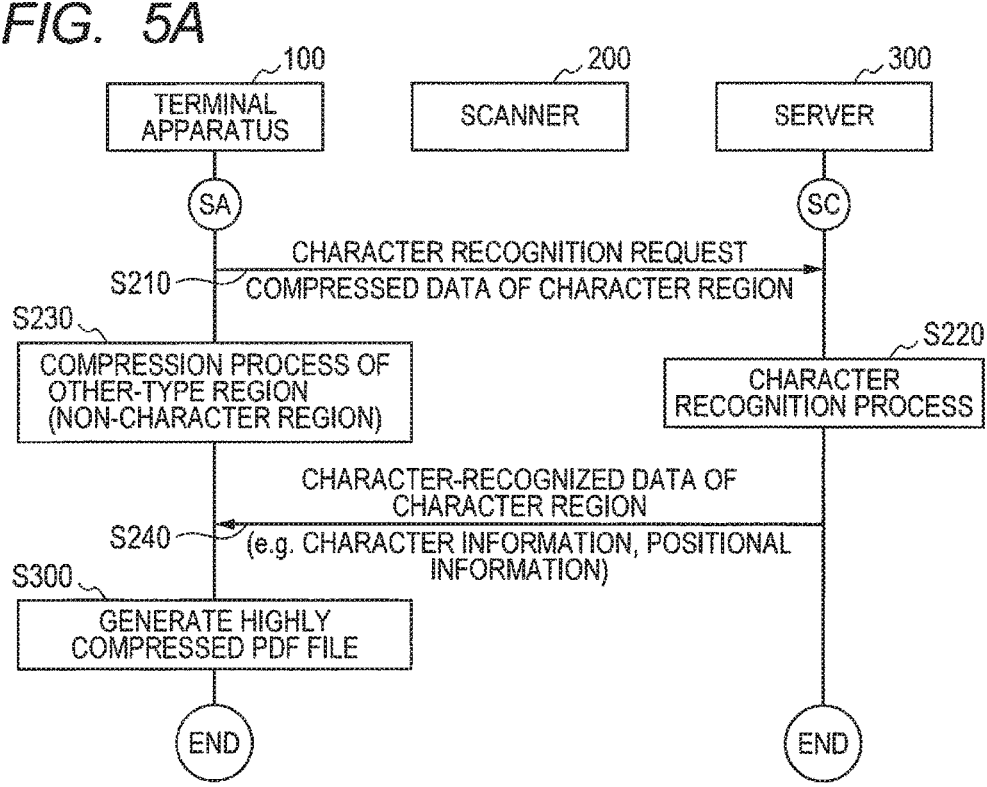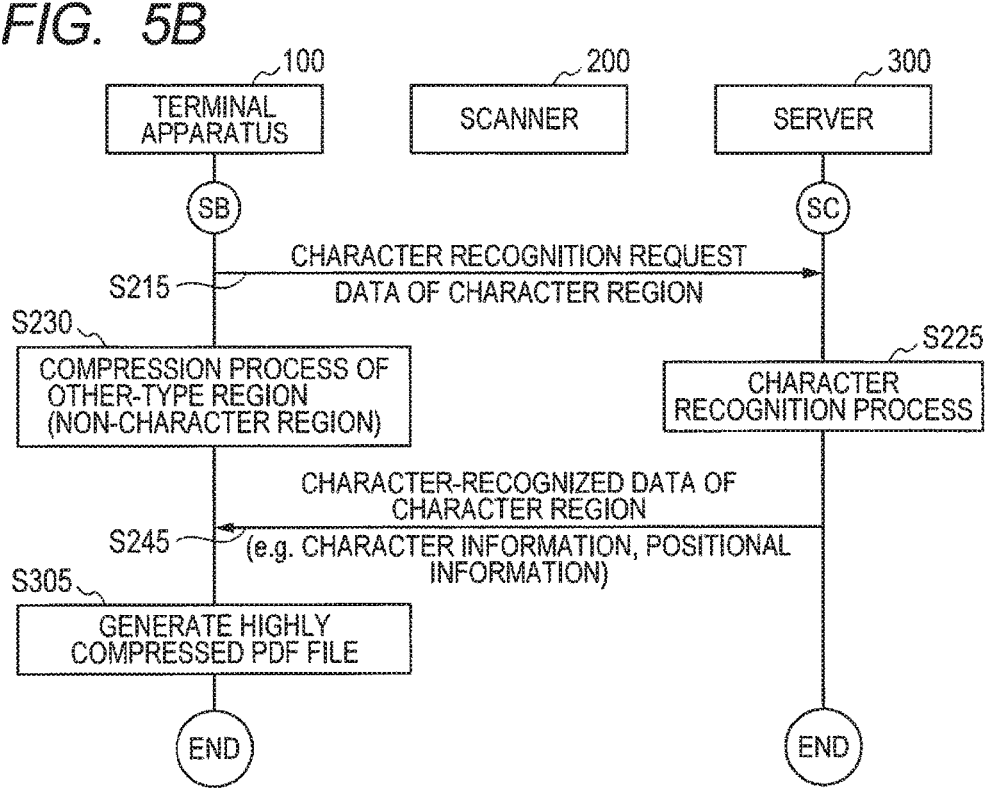

DATA PROCESSING APPARATUS, STORAGE MEDIUM STORING PROGRAM, AND DATA PROCESSING METHOD

CROSS REFERENCE TO RELATED APPLICATIONS

This application claims priority from Japanese Patent Application No. 2016-149196 filed Jul. 29, 2016. The entire content of the priority application is incorporated herein by reference.

TECHNICAL FIELD

This specification relates to technology of performing a character recognition process by using image data.

BACKGROUND

Various processes for generating data in which characters can be searched have been proposed. For example, technology has been proposed in which a character portion is extracted from a target image to be processed, a character recognition process is performed on the character portion to acquire a character code, and data indicative of the image and the character code are combined into one file.

SUMMARY

According to one aspect, this specification discloses a data processing apparatus. The data processing apparatus includes a processor and a memory storing instructions. When executed by the processor, the instructions cause the processor to perform: acquiring target image data that is generated by optically reading an original document; acquiring, by using the target image data, character region data and other-type region data, the character region data being indicative of a character region representing characters, the other-type region data being indicative of an other-type region different from the character region; generating first compressed data by performing a first compression process on the character region data; acquiring first character-recognized data including first character information that is generated by performing a character recognition process on the first compressed data; generating second compressed data by performing a second compression process on the other-type region data, the second compression process being different from the first compression process; and acquiring second character-recognized data including second character information that is generated by performing the character recognition process on the other-type region data.

According to another aspect, this specification also discloses a non-transitory computer-readable storage medium storing a set of program instructions executable on a data processing apparatus. The set of program instructions includes: acquiring target image data that is generated by optically reading an original document; acquiring, by using the target image data, character region data and other-type region data, the character region data being indicative of a character region representing characters, the other-type region data being indicative of an other-type region different from the character region; generating first compressed data by performing a first compression process on the character region data; acquiring first character-recognized data including first character information that is generated by performing a character recognition process on the first compressed data; generating second compressed data by performing a second compression process on the other-type region data, the second compression process being different from the first compression process; and acquiring second character-recognized data including second character information that is generated by performing the character recognition process on the other-type region data.

According to still another aspect, this specification also discloses a data processing method. The data processing method includes: acquiring target image data that is generated by optically reading an original document; acquiring, by using the target image data, character region data and other-type region data, the character region data being indicative of a character region representing characters, the other-type region data being indicative of an other-type region different from the character region; generating first compressed data by performing a first compression process on the character region data; acquiring first character-recognized data including first character information that is generated by performing a character recognition process on the first compressed data; generating second compressed data by performing a second compression process on the other-type region data, the second compression process being different from the first compression process; and acquiring second character-recognized data including second character information that is generated by performing the character recognition process on the other-type region data.

The technology disclosed in this specification can be realized in various modes, such as an image processing method, an image processing apparatus, and a non-transitory storage medium storing a computer program for realizing functions of the method and the image processing apparatus, for example.

BRIEF DESCRIPTION OF THE DRAWINGS

Embodiments in accordance with this disclosure will be described in detail with reference to the following figures wherein:

FIGS. 5A and 5B are sequence diagrams showing the file generating process according to the second embodiment.

DETAILED DESCRIPTION

In the above-mentioned technology, there is a room for improvement in performing a character recognition process by differentiating a region representing characters and other-type region.

In view of the foregoing, an example of an object of this specification is to disclose technology of performing a character recognition process by differentiating a region representing characters and other-type region in a method different from a conventional method.

An aspect of this disclosure will be described while referring to the accompanying drawings.

A. First Embodiment

A-1: Configuration of System 1000

Figure 1:
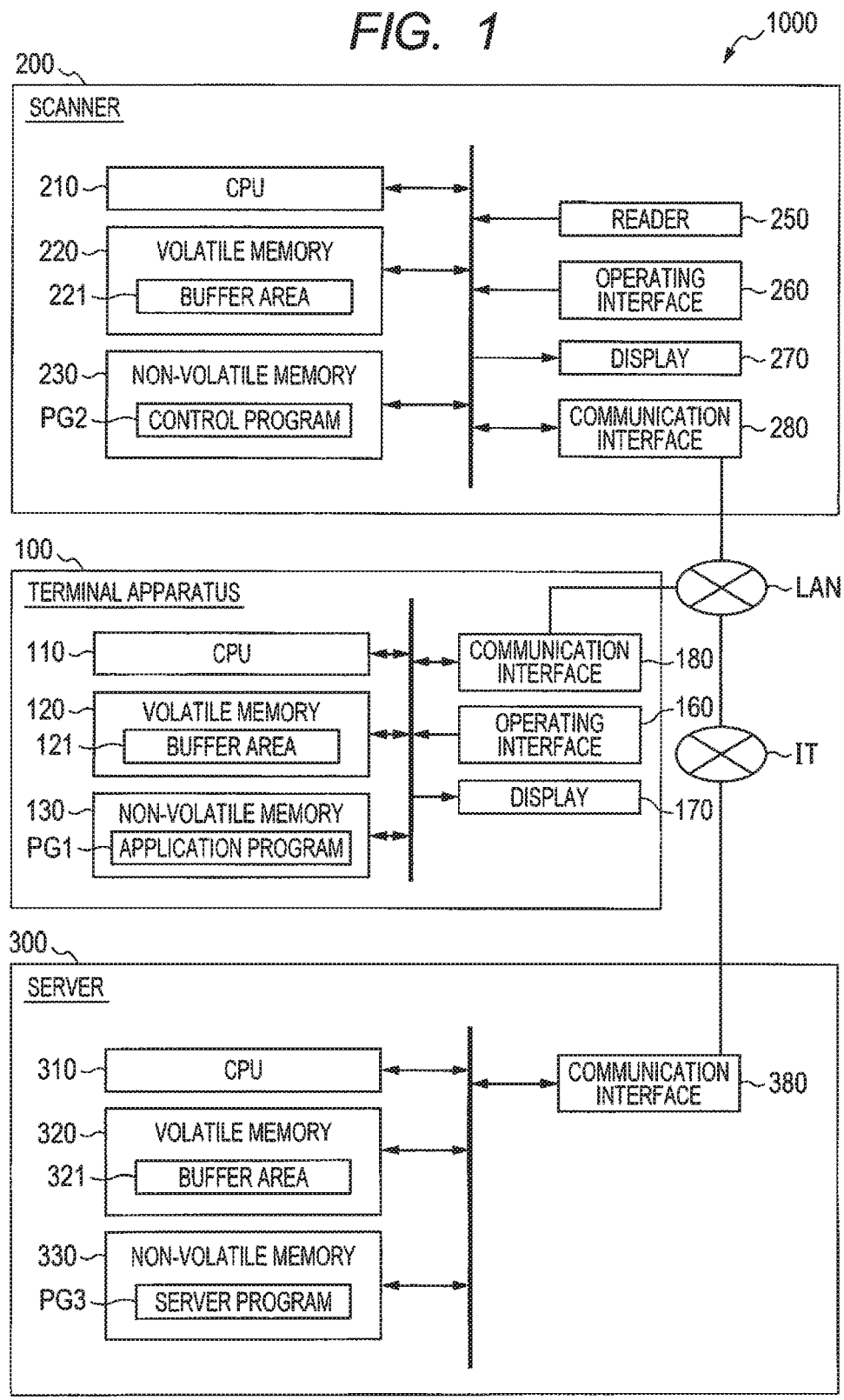
FIG. 1 is a block diagram showing a configuration of a system 1000 according to embodiments.

As shown in FIG. 1, a system 1000 includes a terminal apparatus 100, a scanner 200, and a server 300. The terminal apparatus 100 and the scanner 200 are connected to a wired or wireless local area network LAN. The local area network LAN is connected to Internet IT through a relay apparatus (not shown) such as a router, for example. The server 300 is connected to the Internet IT. The terminal apparatus 100 and the scanner 200 perform communication with each other through the local area network LAN. The terminal apparatus 100 and the server 300 perform communication with each other through the local area network LAN and the Internet IT. The scanner 200 and the server 300 also perform communication with each other through the local area network LAN and the Internet IT.

The terminal apparatus 100 is a terminal apparatus used by the user of the scanner 200, and is a personal computer or a smartphone, for example. The terminal apparatus 100 includes a processor 110 (for example, a CPU) as a controller of the terminal apparatus 100, a volatile memory 120 such as a RAM, a non-volatile memory 130 such as a hard disk drive and a flash memory, an operating interface 160 such as a keyboard and a touch panel, a display 170 such as a liquid crystal display, and a communication interface 180 for communication with external apparatuses.

The communication interface 180 includes an interface compatible with the Ethernet™ or the Wi-Fi standard. The communication interface 180 is used for communication with the scanner 200 and the server 300.

The volatile memory 120 provides a buffer area 121 that temporarily stores various intermediate data generated when the processor 110 performs processes. The non-volatile memory 130 stores an application program PG1.

The application program PG1 is a computer program that is provided by a vendor of the scanner 200. The application program PG1 is provided by being downloaded from a server connected to the terminal apparatus 100 through the Internet IT. Instead, the application program PG1 may be provided in a form stored in a CD-ROM, a DVD-ROM, or the like.

The processor 110 performs the application program PG1, thereby serving as a scanner driver for controlling the scanner 200. For example, the processor 110 controls the scanner 200 to read an original document and generate scan data. The scan data is image data of a JPEG (Joint Photographic Experts Group) format indicative of a color image, for example. Further, the processor 110 cooperates with the server 300 to realize a file generating process described later.

The scanner 200 includes a processor 210 such as a CPU, a volatile memory 220 such as a RAM, a non-volatile memory 230 such as a hard disk drive and an EEPROM, a reader 250, an operating interface 260 such as a touch panel and buttons, a display 270 such as a liquid crystal display layered on the touch panel, and a communication interface 280 including an interface for communication with external apparatuses.

The reader 250 optically reads an original document by using an image sensor in accordance with controls of the processor 210, thereby generating scan data. The reader 250 of the present embodiment has an Auto Document Feeder (ADF) that automatically feeds a plurality of sheets of original document prepared by the user, one sheet at a time, by using the driving force of the motor. However, the Auto Document Feeder may be omitted.

The communication interface 280 includes an interface compatible with the Ethernet™ or the Wi-Fi standard, for example. The communication interface 280 is used for communication with the server 300 and the terminal apparatus 100 described above.

The volatile memory 220 provides a buffer area 221 that temporarily stores various intermediate data generated when the processor 210 performs processes. The non-volatile memory 230 stores a control program PG2.

The control program PG2 is provided in a form preliminarily stored in the non-volatile memory 230 at the time of shipment of the scanner 200. Instead, the control program PG2 may be provided in a form of being downloaded from a server connected to the scanner 200 through the Internet IT.

The processor 210 performs the control program PG2, thereby serving as a controller of the scanner 200. For example, the processor 210 controls the reader 250 to read an original document and generate scan data.

The server 300 (FIG. 1) is a server provided by the vendor of the scanner 200. The server 300 includes a processor 310 as a controller of the server 300 (for example, a CPU), a volatile memory 320 such as a RAM, a non-volatile memory 330 such as a hard disk drive, and a communication interface 380 for connection with the Internet IT.

The volatile memory 320 provides a buffer area 321 that temporarily stores various intermediate data generated when the processor 310 performs processes. The non-volatile memory 330 stores a server program PG3.

The server program PG3 includes a program for performing a character recognition process. The server 300 has a function of performing the character recognition process. The processor 310 cooperates with the terminal apparatus 100 by performing the server program PG3, and realizes a file generating process described later.

Figure 2:
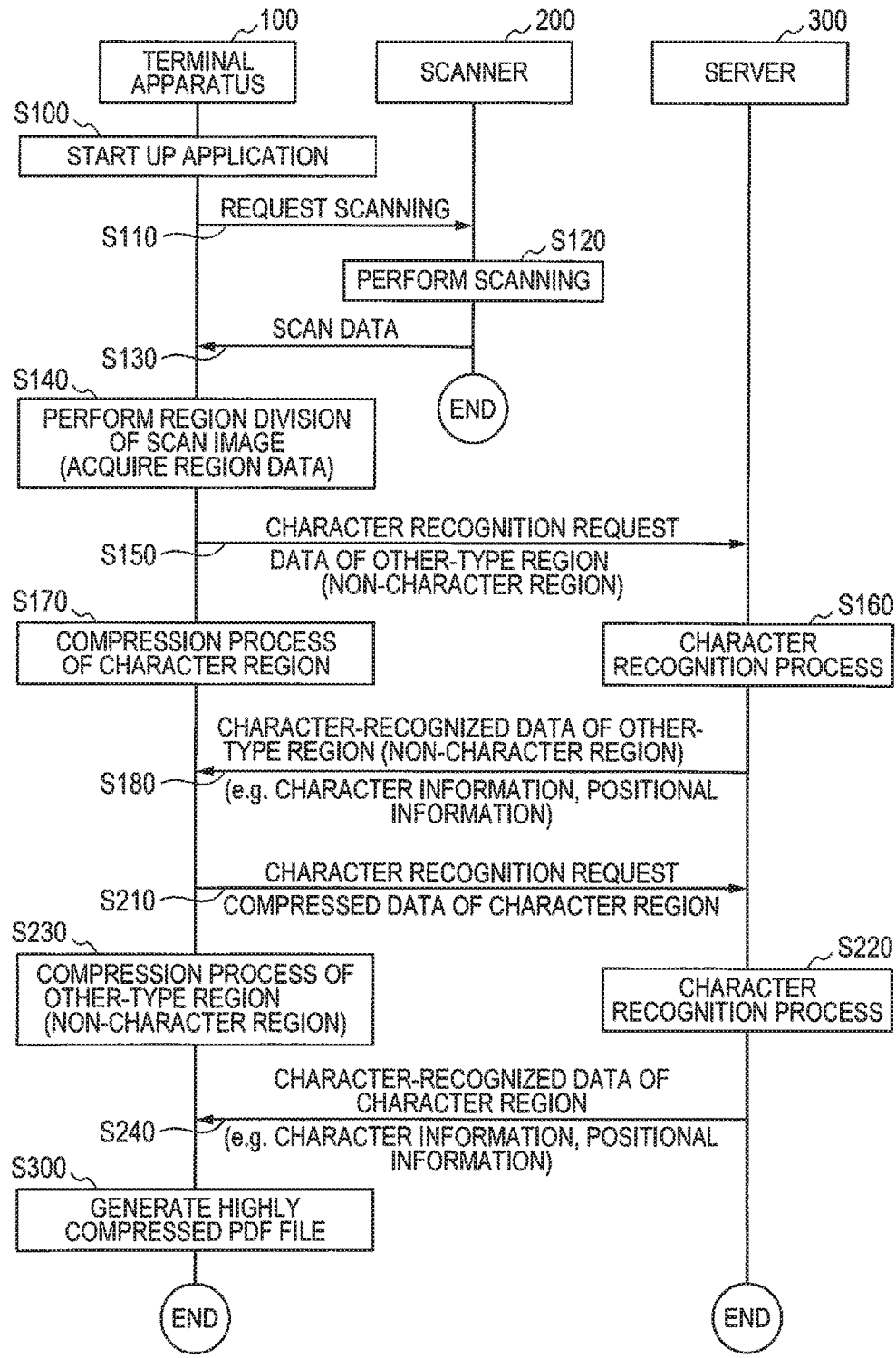
FIG. 2 is a sequence diagram showing a file generating process according to a first embodiment.

A-2. File Generating Process:

As shown in FIG. 2, a file generating process is a process of optically reading an original document prepared by the user, generating scan data indicative of the read image (also referred to as "scan image"), and generating an image file indicative of the scan image by using the scan data. The image file to be generated is a highly compressed PDF file with character information to which character information including a character code indicative of a character in the scan image is added. The highly compressed PDF file is a data file of a PDF (Portable Document Format) format including first compressed data and second compressed data. The first compressed data indicates a character region that is a region having a character in the scan image. The second compressed data indicates another region (also referred to as "non-character region") that is other-type region different from a character in the scan image. In the highly compressed PDF file, one scan image is represented by the first compressed data and the second compressed data. The character information added to the generated highly compressed PDF file is used by the user for searching a desired character from among characters in the scan image, for example.

The file generating process is started when a start instruction for reading an original document is inputted in the terminal apparatus 100 that serves as a scanner driver. For example, the user places one or more sheet of original document on the ADF of the scanner 200, starts up the application, specifies, as the saving format, a highly compressed PDF file with character information in an input screen (not shown) of the application, and then inputs the start instruction. Hereinafter, descriptions will be provided by assuming that one sheet of original document is placed on the ADF.

In S100, the user operates the operating interface 160 of the terminal apparatus 100 (FIG. 1) to input an instruction of starting up the application. In response to the instruction, the processor 110 of the terminal apparatus 100 starts up the application and displays an input screen on the display 170 in accordance with the application program PG1. The user operates the operating interface 160 to input a start instruction. The processor 110 starts the file generating process in response to the start instruction.

In S110, the processor 110 of the terminal apparatus 100 transmits a scan request to the scanner 200. In S120, in response to the request from the terminal apparatus 100, the processor 210 of the scanner 200 controls the reader 250 in accordance with the control program PG2. Specifically, the processor 210 controls the reader 250 to read the original document and to generate scan data. In S130, the processor 210 transmits the generated scan data to the terminal apparatus 100. If the received scan data is compressed (for example, JPEG compression), the processor 110 of the terminal apparatus 100 decompresses the scan data for image processing described later, and acquires bitmap data representing the scan image. In the present embodiment, the bitmap data to be acquired is bitmap data representing a color image with three color components of RGB. Hereinafter, bitmap data representing a scan image is referred to as "target bitmap data". The processor 110 stores the acquired target bitmap data in the memory of the terminal apparatus 100 (for example, the volatile memory 120 or the non-volatile memory 130).

The target bitmap data is data that is obtained by decompressing compressed scan data. Here, the color value of each of a plurality of pixels represented by the target bitmap data is identical to the color value of each of a plurality of pixels represented by the scan data. Thus, the target bitmap data represents an image identical to the scan data. If the scan data is not compressed, the processor 110 may use the scan data as the target bitmap data as it is.

Figure 3:
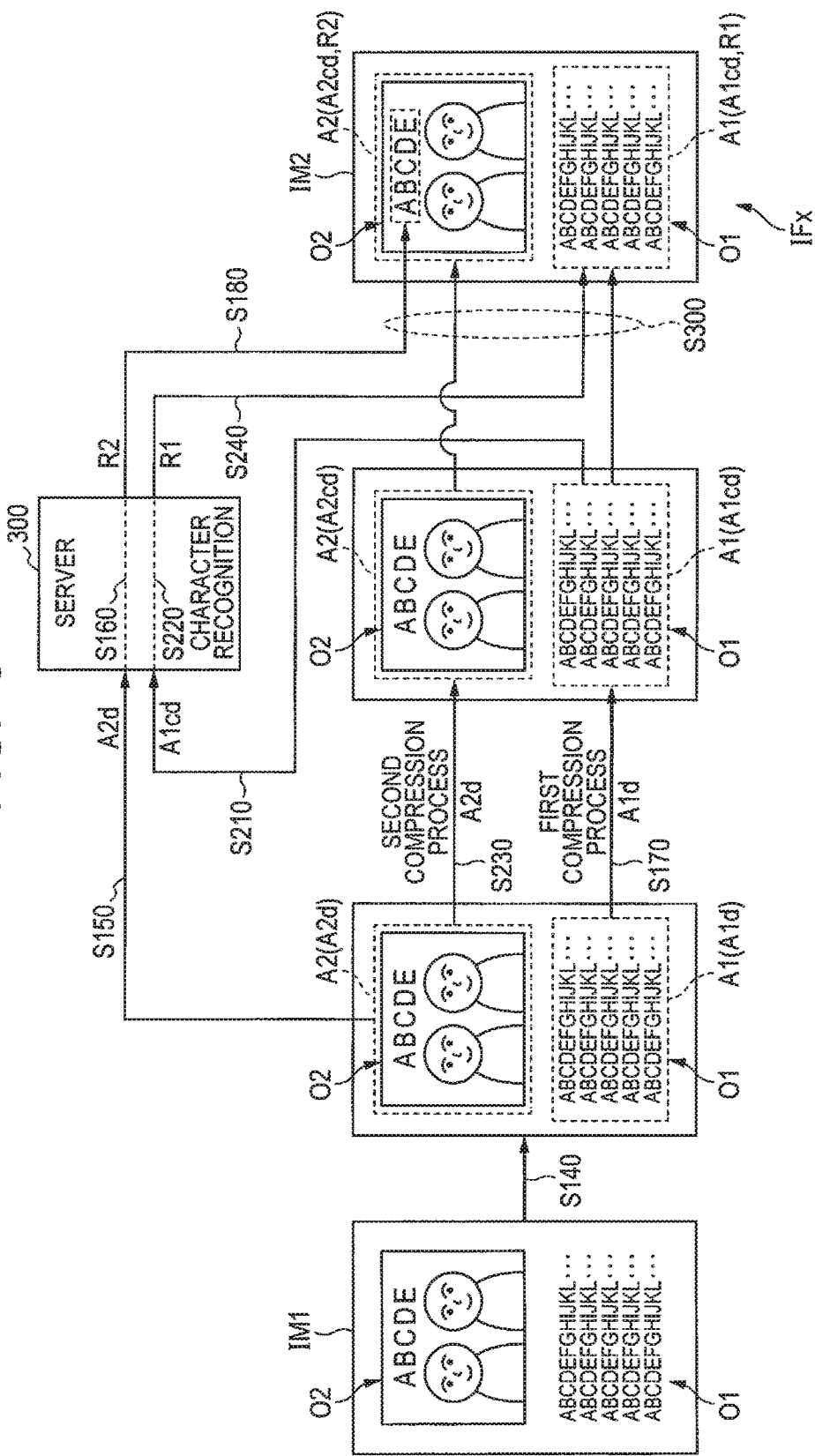
FIG. 3 is a schematic diagram showing an overview of the file generating process.

At the left of FIG. 3, a scan image IM1 is shown. In the example of FIG. 3, the scan image IM1 has two objects O1, O2. The first object O1 is a character string object. The second object O2 is a photograph object. This photograph object O2 includes a portion indicative of characters. Hereinafter, descriptions will be provided by assuming that this scan image IM1 is processed.

In S140 of FIG. 2, the processor 110 of the terminal apparatus 100 performs region division of the scan image. The region division is a process of, by using the target bitmap data, acquiring character region data indicative of a character region having characters and other-type region data indicative of other-type region different from the character region. In the present embodiment, the processor 110 determines regions indicative of objects in the scan image IM1, and determines whether the type of each object region is "character" or "non-character".

As the method of determining object regions, a known method may be used. For example, the following method may be used. The processor 110 applies a known edge detection filter (for example, a Sobel filter) to the target bitmap data in order to extract edges in the scan image IM1, and identifies, as an object region, a region in which the edge amount is larger than a predetermined reference value. Here, the processor 110 may divide the scan image into a plurality of process regions (for example, a rectangular region of a particular size) and may calculate the edge amount of each process region. And, the processor 110 may identify, as one object region, one continuous region that is formed by continuous process regions having edge amounts larger than the reference value. In the example of FIG. 3, a first object region A1 having the first object O1 and a second object region A2 having the second object O2 are determined by the process of S140.

As the method of determining whether the type of an object region is character, a known method can be used. For example, the following method may be used. The processor 110 uses a histogram of brightness of the object region to calculate a number of types C of brightness values included in this region. Further, the processor 110 classifies a plurality of pixels included in the object region into background pixels having color close to the color around the object region (background color) and object pixels other than the background pixels, and calculates a ratio D of the object pixels. The ratio D of the object pixels is represented by [the number of the object pixels]/[the number of the background pixels]. The number of types C of brightness value (the number of types of color) and the ratio D of the object pixels in the character object region tend to be smaller than those in the non-character object region. The processor 110 determines that the type of the object region is character when the number of types C of brightness values (the number of types of color) of the object region of the determination target is smaller than a predetermined first threshold value and the ratio D of the object pixel is smaller than a predetermined second threshold value. In the example of FIG. 3, the type of the first object region A1 is determined to be character, and the type of the second object region A2 is determined to be non-character. In this way, even when an object includes a portion having character, the type of this object region is sometimes determined to be non-character.

In S140, the processor 110 acquires region data that is a portion representing each object region, out of the target bitmap data. In the example of FIG. 3, the processor 110 acquires character region data A1d that is a portion representing the first object region A1 and other-type region data A2d that is a portion representing the second object region A2. Hereinafter, the character object region will also be referred to as "character region", and the non-character object region will also be referred to as "non-character region". The other-type region data A2d will also be referred to as "non-character region data A2d".

The color value (here, the tone value of each of RGB color components) of each of a plurality of pixels represented by region data indicative of an object region is the same as the color value of each of a plurality of pixels of the same object region represented by scan data. For example, the character region data A1d represents the same color value as the color value (here, the tone value of each of RGB color components) of each of a plurality of pixels in the character region A1 represented by the scan data. Similarly, the non-character region data A2d represents the same color value as the color value of each of a plurality of pixels in the non-character region A2 represented by the scan data. Note that, in scan data in the JPEG format, color of each pixel is sometimes represented by three color components YCbCr. In this case, too, due to particular correspondence between the YCbCr color space and the RGB color space, YCbCr color values represented by the scan data are associated with RGB color values. It can be said that these RGB color values are represented by the scan data.

In S150 of FIG. 2, the processor 110 of the terminal apparatus 100 transmits a character recognition request of the non-character region to the server 300. Specifically, the processor 110 transmits, to the server 300, data indicative of the character recognition request and image data of the target of the character recognition process. In the example of FIG. 3, the non-character region data A2d that is image data of the target of the character recognition process is transmitted to the server 300.

In S160 of FIG. 2, in response to the character recognition request from the terminal apparatus 100, the processor 310 of the server 300 performs the character recognition process in accordance with the server program PG3. In the character recognition process, the image data associated with the character recognition request is used (here, the non-character region data A2d received together with the character recognition request). As the character recognition process, various known processes may be used. For example, characters may be recognized by pattern matching using font images representing various characters. Alternatively, the process called "optical character recognition" may be used.

In S170 of FIG. 2, the processor 110 of the terminal apparatus 100 performs a compression process of a portion representing a character region out of the target bitmap data. By this compression process, compressed character region data having smaller data size than the character region data prior to compression is generated. In the present embodiment, the compression process of the character region is a binarization process. For example, the processor 110 classifies a plurality of pixels in the character region into one of a background pixel having a color value in a background color range indicative of background color and a character pixel having a color value outside the background color range, thereby generating binary data indicative of characters in the character region. The background color range is, for example, a predetermined color value range (for example, a range including white color). Instead, the processor 110 may analyze the character region to determine the background color range. For example, the background color range may be a particular range having, in the center, the mode of each color component (for example, each mode Rm, Gm, Bm of red R, green G, blue B) of color values of a plurality of pixels in the character region. In the example of FIG. 3, the character region data A1d is compressed, and compressed character region data A1cd is generated. In the present embodiment, the processor 110 starts S170 before starting reception of the result of character recognition of the non-character region from the server 300. For example, in response to starting S150 (transmission of the character recognition request of the non-character region to the server 300), the processor 110 of the terminal apparatus 100 starts a compression process of the character region without waiting for a response from the server 300.

In S180 of FIG. 2, the processor 310 of the server 300 transmits, to the terminal apparatus 100, character-recognized data indicative of the result of the character recognition process in S160 (hereinafter, referred to as "recognized data"). The recognized data includes character information indicative of each recognized character (for example, a character code) and positional information indicative of the position of each recognized character in the non-character region. Data R2 in FIG. 3 indicates recognized data (hereinafter, referred to as "second recognized data R2"). The processor 110 of the terminal apparatus 100 temporarily stores the received recognized data R2 in the memory of the terminal apparatus 100 (for example, the volatile memory 120 or the non-volatile memory 130).

In S210 of FIG. 2, the processor 110 of the terminal apparatus 100 transmits a character recognition request of the character region to the server 300. Unlike the above-described S150, the compressed data generated in S170 is transmitted to the server 300, as image data of the target of the character recognition process. In the example of FIG. 3, the compressed character region data A1cd is transmitted to the server 300.

In S220 of FIG. 2, in response to the character recognition request from the terminal apparatus 100, the processor 310 of the server 300 performs a character recognition process in accordance with the server program PG3. The image data of the target of the character recognition process is compressed character region data (for example, the compressed character region data A1cd).

In S230, the processor 110 of the terminal apparatus 100 performs a compression process of a portion representing the non-character region, out of the target bitmap data. The compression process of the non-character region is a compression process different from the compression process of the character region (S170). This compression process generates compressed non-character region data having a smaller data size than the data size of the non-character region data prior to compression. In the present embodiment, the compression process of the non-character region is a process of reducing the resolution (a resolution reduction process). For example, the processor 110 performs JPEG compression with a sampling factor that is set such that the color value of part of the pixels is omitted. This JPEG compression reduces the resolution of an image by allocating the same pixel value to a plurality of pixels adjacent to each other, without changing pixel density. As described above, the JPEG compression is an example of the resolution reduction process. In the example of FIG. 3, the non-character region data A2d is compressed, and the compressed non-character region data A2cd is generated. In the present embodiment, the processor 110 starts S230 before starting reception of the result of character recognition of the character region from the server 300. For example, in response to starting S210, the processor 110 starts the compression process of the non-character region without waiting for a response from the server 300.

In S240, the processor 310 of the server 300 transmits, to the terminal apparatus 100, recognized data indicative of the result of the character recognition process in S220. As is the case with the recognized data of the above-described S180, the recognized data transmitted in S240 includes character information (for example, character code) and positional information indicative of the position of character in the character region. Data R1 in FIG. 3 indicates recognized data (hereinafter, referred to as "first recognized data R1"). The processor 110 of the terminal apparatus 100 temporarily stores the received recognized data R1 in the memory of the terminal apparatus 100 (for example, the volatile memory 120 or the non-volatile memory 130).

In S300 of FIG. 2, the processor 110 of the terminal apparatus 100 uses the compressed character region data A1cd, the compressed non-character region data A2cd, the first recognized data R1, the second recognized data R2, and a character color value (described later) to generate a highly compressed PDF file (an example of "combined data"). FIG. 3 shows an image IM2 represented by generated PDF file IFx (referred to as "PDF image IM2"). As shown in FIG. 3, the PDF image IM2 has objects O1, O2, like the scan image IM1. The first object O1 is represented by the compressed character region data A1cd, and the second object O2 is represented by the compressed non-character region data A2cd.

The PDF format is set such that image data in a plurality of different formats are stored in one file and that, when an image is reproduced by using this file, images represented by these image data are superposed to be reproduced as one image. The processor 110 generates the highly compressed PDF file IFx such that the PDF image IM2 is approximately the same as the scan image IM1. For example, the arrangement of the object region represented by each compressed region data in the PDF image IM2 is determined to be the same as the arrangement of each object region in the scan image IM1. The character color value indicative of the color of characters indicated by binary data of the character region is set to be approximately the same as the color of characters in the scan image IM1. For example, the average value of each color component of the color value of the above-described character pixel (for example, average value Ra, Ga, Ba of each of red R, green G, blue B) is used as a character color value.

Further, the processor 110 stores, in the highly compressed PDF file, character information indicated by the first recognized data R1 and character information indicated by the second recognized data R2. Accordingly, a highly compressed PDF file in which characters can be searched is generated. Each character information is associated with the position identified by positional information represented by the recognized data R1, R2.

In S300 of FIG. 2, the processor 110 of the terminal apparatus 100 stores the generated highly compressed PDF file in the memory of the terminal apparatus 100 (for example, the non-volatile memory 130). By this step, the process of FIG. 2 ends. The user can use the highly compressed PDF file stored in the memory.

As described above, in the present embodiment, with respect to the character region, recognized data generated by the character recognition process for compressed data (for example, the compressed character region data A1cd in FIG. 3) is acquired. The compressed data used for the character recognition process of the character region is obtained by simplifying information of the character region indicated by scan data (for example, the color value of each of a plurality of pixels), and is obtained by binarizing the character region indicated by the scan data in the present embodiment. With respect to the non-character region, recognized data generated by the character recognition process for non-compressed data (for example, the non-character region data A2d in FIG. 3) is acquired. Specifically, data used for character recognition of the non-character region represents information identical to information of the non-character region indicated by the scan data (for example, the color value of each of a plurality of pixels). In this way, the character recognition process is performed while differentiating a character region and an other-type region.

In the binarization process that is the compression process for the character region, no halftone pixels are generated. Thus, in an image represented by binarized image data, the outline of character is represented sharply without blur. Accordingly, even if compressed (binarized) image data is used for the character recognition process, the accuracy of character recognition does not tend to be reduced. On the other hand, in the resolution reduction process that is the compression process for the non-character region (JPEG compression in the embodiment), the same pixel value is allocated to a plurality of pixels adjacent to each other. Thus, in an image represented by image data for which the resolution has been reduced, the outline of character may be represented with blur. Accordingly, when compressed (low resolution) image data is used for the character recognition process, the accuracy of character recognition may be reduced. In the present embodiment, with respect to the non-character region, non-character region data prior to compression is used to perform the character recognition process. Thus, when the non-character region includes a character, deterioration of the accuracy in character recognition of the non-character region is suppressed.

The processor 110 of the terminal apparatus 100 uses compressed region data, as data indicative of each of the character region and the non-character region, to generate a highly compressed PDF file. Accordingly, the data size of the generated data file can be reduced. In particular, in the present embodiment, binarized data (for example, the compressed character region data A1cd in FIG. 3) is used as compressed data indicative of the character region. Accordingly, characters in the character region are sharp and easy to read. Further, in the present embodiment, low resolution data of which resolution has been reduced (for example, the compressed non-character region data A2cd in FIG. 3) is used as compressed data indicative of the non-character region. This suppresses change of appearance of an image (for example, a photograph) in the non-character region.

In S210 of FIG. 2, the processor 110 of the terminal apparatus 100 transmits compressed data indicative of the character region (for example, the compressed character region data A1cd in FIG. 3) to the server 300 that performs a character recognition process. In S240 of FIG. 2, the processor 110 acquires, from the server 300, the first recognized data R1 indicative of the character recognition result of the character region. The compressed data has a smaller data size than the data prior to compression, which suppresses a communication load between the terminal apparatus 100 and the server 300 for acquiring the character recognition result of the character region. In S150 of FIG. 2, the processor 110 transmits, to the server 300, data having the same information as the portion indicative of the non-character region of scan data (for example, the non-character region data A2d in FIG. 3). In S180 of FIG. 2, the processor 110 acquires, from the server 300, the second recognized data R2 indicative of the character recognition result of the non-character region. This suppresses deterioration of accuracy in character recognition of the non-character region.

As described with reference to FIG. 2, the processor 110 of the terminal apparatus 100 starts generation of compressed data of the character region (S170) before starting acquisition of the recognized data of the non-character region from the server 300 (S180). Accordingly, compared with a case where generation of the compressed data of the character region is started after acquisition of the recognized data of the non-character region is started, processing time for completing both of the character recognition process of the non-character region and the compression process of the character region can be reduced. In particular, in the present embodiment, in S150 the processor 110 of the terminal apparatus 100 starts transmission of a request for the character recognition process of the non-character region to the server 300 (that is, starts transmission of the image data of the target of the character recognition process of the non-character region to the server 300) before starting generation of the compressed data of the character region (S170). Accordingly, the terminal apparatus 100 and the server 300 perform the compression process of the character region (S170) and the character recognition process of the non-character region (S160) in parallel. As a result, the processing time for completing the both processes can be reduced appropriately. Note that generation of the compressed data of the character region (S170) may be started before completing transmission of the non-character region data for the character recognition process of the non-character region to the server 300, or may be started after completing transmission of the non-character region data.

As described with reference to S300 of FIG. 2, the processor 110 of the terminal apparatus 100 generates data (specifically, the highly compressed PDF file) including compressed data of the character region (the compressed character region data A1cd in FIG. 3), character information generated in the character recognition process of the character region (the first recognized data R1 in FIG. 3), compressed data of the non-character region (the compressed non-character region data A2cd in FIG. 3), and character information generated in the character recognition process of the non-character region (the second recognized data R2 in FIG. 3). Accordingly, the processor 110 can use character information and generate a data file having a small data size.

As described with reference to S110 to S130 of FIG. 2, the processor 110 of the terminal apparatus 100 acquires scan data from the scanner 200 through a network (in the embodiment, the local area network LAN in FIG. 1). Accordingly, the terminal apparatus 100 not having the reader 250 can acquire scan data from the scanner 200 through the network.

B. Second Embodiment

Figure 4:
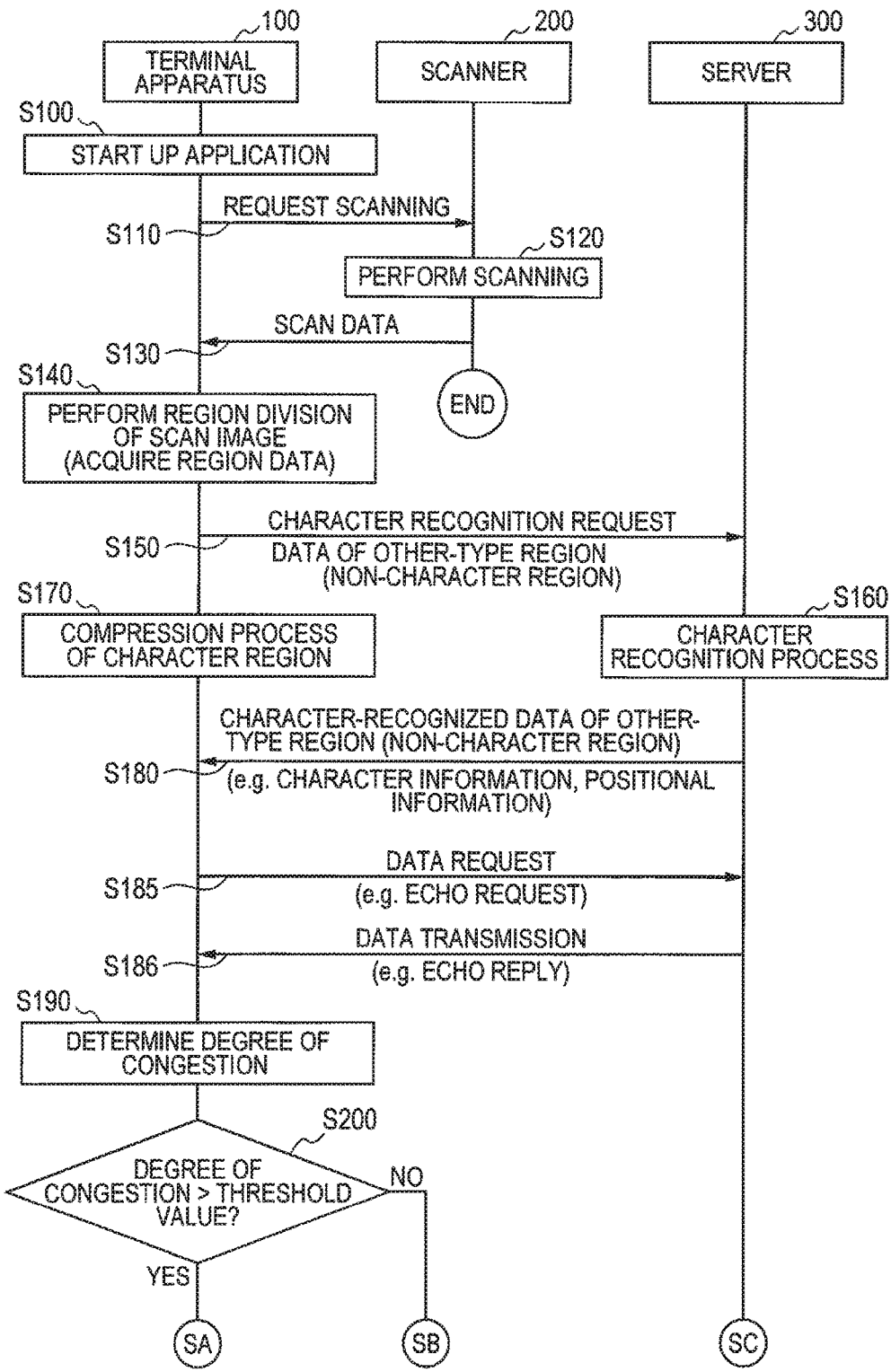
FIG. 4 is a sequence diagram showing a file generating process according to a second embodiment.

A second embodiment shown in FIGS. 4 to 5B is different from the embodiment of FIG. 2 in that data transmitted to the server 300 for the character recognition process of the character region is selected from the character region data A1d and the compressed character region data A1cd depending on a degree of congestion of a communication path between the terminal apparatus 100 and the server 300. The steps in FIGS. 4 to 5B that are the same as the steps in FIG. 2 are indicated by the same reference numerals to avoid duplicating descriptions.

The processes from S100 to S180 in FIG. 4 are the same as the processes from S100 to S180 in FIG. 2. In S185 and S186, the processor 110 of the terminal apparatus 100 acquires data used for determining the degree of congestion of the communication path between the terminal apparatus 100 and the server 300. In the present embodiment, in S185 the processor 110 transmits an echo request packet of ICMP (Internet Control Message Protocol) to the server 300. In S186, in response to receiving the echo request, the processor 310 of the server 300 transmits an echo reply packet to the terminal apparatus 100. The processor 110 of the terminal apparatus 100 measures the elapsed time from transmission of the echo request packet in S185 until reception of the echo reply packet in S186.

In S190 of FIG. 4, the processor 110 of the terminal apparatus 100 determines the degree of congestion of the communication path between the terminal apparatus 100 and the server 300. In the present embodiment, the processor 110 uses the elapsed time measured in S185, S186 as the degree of congestion. When the communication path is congested, the time required for communication increases and thus the above-mentioned elapsed time increases. That is, it can be said that, as the elapsed time is longer, the communication path is more congested.

In S200, the processor 110 of the terminal apparatus 100 determines whether the degree of congestion exceeds the threshold value. In the present embodiment, it is determined whether the elapsed time exceeds a predetermined threshold time.

When the elapsed time exceeds the threshold time, that is, when the degree of congestion exceeds the threshold value (S200: Yes), the process moves to the sequence chart of FIG. 5A. Steps S210, S220, S230, S240, and S300 in FIG. 5A are the same as steps S210, S220, S230, S240, and S300 in FIG. 2, respectively. In the sequence chart of FIG. 5A, as is the case with the embodiment of FIG. 2, steps S210, S220, S230, S240, and S300 are executed and a highly compressed PDF data is generated. That is, the file generating process in a case where the degree of congestion exceeds the threshold value is the same as the file generating process in the embodiment of FIG. 2.

When the elapsed time is less than or equal to the threshold time, that is, the degree of congestion is less than or equal to the threshold value (S200: No), the process moves to the sequence chart of FIG. 5B. The sequence chart of FIG. 5B is the sequence chart obtained by replacing S210, S220, S240, and S300 in FIG. 5A with S215, S225, S245, and S305, respectively.

In S215 of FIG. 5B, the processor 110 of the terminal apparatus 100 transmits a character recognition request of the character region to the server 300. Unlike S210 of FIG. 5A, the processor 110 transmits the character region data A1d, not the compressed character region data A1cd, to the server 300 as the image data of the target of the character recognition process.

In S225, in response to the character recognition request from the terminal apparatus 100, the processor 310 of the server 300 performs the character recognition process in accordance with the server program PG3. The difference from the above-described S220 is that the image data of the target of the character recognition process is the character region data A1d.

In S245, the processor 310 of the server 300 transmits, to the terminal apparatus 100, recognized data indicative of the result of the character recognition process in S225. The recognized data transmitted in S245 includes character information and positional information, as is the case with the recognized data of the above-described S240. Hereinafter, the recognized data transmitted in S245 is referred to as "third recognized data". The processor 110 of the terminal apparatus 100 temporarily stores the received third recognized data in the memory (for example, the volatile memory 120 or the non-volatile memory 130) of the terminal apparatus 100.

In S305, the processor 110 of the terminal apparatus 100 uses the compressed character region data A1cd generated in S170 (FIG. 4), the compressed non-character region data A2cd generated in S230 (FIG. 5B), the third recognized data acquired in S245 (FIG. 5B), the second recognized data R2 acquired in S180 (FIG. 4), and the character color value to generate a highly compressed PDF file. The difference from S300 in FIG. 5A is that the third recognized data is used instead of the first recognized data R1. The highly compressed PDF file generated in S305 represents the same image (for example, the image IM2 in FIG. 3) as the highly compressed PDF file generated in S300 (FIG. 5A). The processor 110 of the terminal apparatus 100 stores the generated highly compressed PDF file in the memory (for example, the non-volatile memory 130) of the terminal apparatus 100. This ends the processes in FIGS. 4 and 5B.

As described above, in the present embodiment, when the degree of congestion is larger than the threshold value (FIG. 4, S200: Yes), the processor 110 of the terminal apparatus 100 transmits the compressed character region data A1cd to the server 300 (FIG. 5A, S210), and acquires, from the server 300, the first recognized data R1 obtained by the character recognition process of the compressed character region data A1cd (S240). In this way, when the communication path to the server 300 is congested, the compressed character region data A1cd is transmitted to the server 300, thereby suppressing the communication load between the terminal apparatus 100 and the server 300 and suppressing an increase of the time required for communication. When the degree of congestion is less than or equal to the threshold value (FIG. 4, S200: No), the processor 110 transmits the character region data A1$d$ to the server 300 (FIG. 5B, S215), and acquires, from the server 300, the third recognized data obtained by the character recognition process of the character region data A1$d$ (S245). In a compression process of a character region (binarization in the embodiment), there is a case where separation of character and background is performed inappropriately. For example, there is a case where character becomes illegible by binarization. In such case, there is possibility that deterioration of character recognition accuracy can be suppressed by using character region data prior to compression (for example, the character region data A1$d$) in the character recognition process. Further, when the communication path to the server 300 is not congested, the processor 110 transmits character region data prior to compression to the server 300. This suppresses excessive congestion of the communication path.

As described with reference to FIGS. 4 and 5A, the process in a case where the degree of congestion exceeds the threshold value is the same as the process in FIG. 2. Accordingly, the present embodiment has the same various advantages as those of the embodiment in FIG. 2.

C. Modification

While the disclosure has been described in detail with reference to the above aspects thereof, it would be apparent to those skilled in the art that various changes and modifications may be made therein without departing from the scope of the claims.

(1) The first compression process for the character region (FIG. 2, FIG. 4: S170) may be other various processes of reducing the data size, instead of the binarization process. For example, a JPEG compression may be used. In this JPEG compression, the ratio of pixels for which color value is thinned out is higher than that of the JPEG compression used for non-character region. Further, the resolution reduction process (FIG. 2, FIG. 5: S230) for the non-character region (that is, other-type region different from the character region) may be other various processes of reducing the resolution of an image, instead of the JPEG compression. For example, a resolution conversion process of reducing pixel density of the non-character region may be used. Further, the second compression process for the non-character region may be other various processes of reducing data size (in particular, various compression processes different from the first compression process), instead of the resolution reduction process. For example, a color reduction process of reducing the number of colors may be used. An example of the color reduction process may be a process of reducing the size of data indicative of the tone value of one color component of one pixel from eight bits to four bits. In either case, data size can be reduced appropriately by using a compression process in which the amount of information subsequent to compression is smaller than the amount of information prior to compression (in other words, irreversible compression). However, a compression process may be used in which the amount of information subsequent to compression is the same as the amount of information prior to compression (in other words, reversible compression).

(2) In each of the above-described embodiments, the total number of character regions detected from the scan image may be two or more. In this case, the terminal apparatus 100 and the server 300 may perform the compression process for the character region, the character recognition process, and the acquisition process of the recognized data for each character region. For example, steps S170, S210, S220, S240 in FIGS. 2, 4, and 5A and steps S170, S215, S225, S245 in FIGS. 4 and 5B are repeated for each character region. Here, it is preferable that the character color value indicative of color of character represented by binary data be calculated for each character region. Further, the total number of non-character regions detected from the scan image may be two or more. In this case, the terminal apparatus 100 and the server 300 may perform the compression process for the non-character region, the character recognition process, and the acquisition process of the recognized data for each non-character region. For example, steps S150, S160, S180, S230 in FIGS. 2, 4, 5A, and 5B are repeated for each non-character region.

In either case, it is preferable that generation of compressed data of at least one character region (for example, S170 in FIG. 2) be started before acquisition of recognized data of at least one non-character region is started (for example, S180 in FIG. 2). This reduces the processing time for completing both of the character recognition process of the non-character region and the compression process of the character region. Further, it is preferable that transmission of a request of the character recognition process of the non-character region to the server 300 (for example, S150 in FIG. 2) be started (that is, transmission of image data of the target of the character recognition process of the non-character region to the server 300 be started) before generation of compressed data of the character region (for example, S170 in FIG. 2) is started. According to this configuration, the compression process of the character region (S170) and the character recognition process of the non-character region (S160) can be performed in parallel. As a result, the processing time for completing the both processes can be reduced appropriately.

(3) In each of the above-described embodiments, the number of pages of an original document may be two or more. In S130 of FIGS. 2 and 4, image data of the same number of pages as the original document may be acquired as scan data. Further, the terminal apparatus 100 and the server 300 may perform, for each page, processes for one page (for example, the region division, the compression process for each of the character region and the non-character region, the character recognition process, and the acquiring process of recognized data). As the highly compressed PDF file, a PDF file having the same number of pages as the original document may be generated (for example, S300, S305 in FIGS. 2, 5A, and 5B).

(4) In the embodiment of FIG. 4, the determination result of S200 in the case where the degree of congestion is equal to the threshold value may be "Yes" instead of "No". Further, the degree of congestion may be any other value indicative of the degree of congestion of the communication path between the terminal apparatus 100 and the server 300, instead of the elapsed time from transmission of an echo request to reception of an echo reply. For example, a value such as a throughput value (a data transfer amount per unit time) and a packet loss rate may be used. As the network is congested more, the throughput value decreases (that is, as the throughput value is smaller, the degree of congestion is larger). As the network is congested more, the packet loss rate increases (that is, as the packet loss rate is larger, the degree of congestion is larger). The processor 110 of the terminal apparatus 100 may acquire this degree of congestion from another apparatus. For example, the server 300 may analyze the network to determine the value indicative of the degree of congestion, and provide another apparatus (for example, the terminal apparatus 100) with the determined value. Alternatively, the processor 110 of the terminal apparatus 100 may analyze the network to determine the value indicative of the degree of congestion.

(5) The procedure of the file generating process may be various procedures other than the procedure described with reference to FIGS. 2, 4, 5A, and 5B. For example, S170 may be started after S180 is started. Generally, the sequence of performing a plurality of steps for each of the character region and the non-character region (for example, S150, S160, S170, S180, S210, S215, S220, S225, S230, S235, S240, S245) may be changed as appropriate.

The format of an image data file generated by the file generating process may be a format other than the PDF format. For example, an image data file described by another page description language such as the XPS (XML Paper Specification) format may be generated.

(6) The process of performing character recognition while differentiating the character region and the non-character region may be another data process, instead of data processing of generating an image data file. For example, in S300, S305 of FIGS. 2, 4, 5A, and 5B, the processor 110 of the terminal apparatus 100 may store the compressed character region data, the compressed non-character region data, the recognized data of the character region, and the recognized data of the non-character region in a memory (for example, the non-volatile memory 130) for providing the user with these data, instead of generating the image data file. The user can use the data stored in the memory for an arbitrary process.

(7) The format of scan data provided by the scanner 200 may be an arbitrary format instead of the JPEG format (for example, the PNG (Portable Network Graphics) format or PDF format).

(8) The target image data that is data of the target of the data process for performing character recognition while differentiating the character region and other-type region may be various data other than scan data provided by the scanner 200. For example, the target image data may be image data that is obtained by performing image processing on scan data (referred to as "preprocessing"). The preprocessing may be, for example, an image quality adjustment process such as a tone curve adjustment and a white balance adjustment. The preprocessing may be a process different from the image quality adjustment (for example, a color conversion process or a data format conversion process). The color conversion process may be, for example, a conversion process from a YCbCr color space to an RGB color space. The data format conversion process may be, for example, a conversion process from the JPEG format to the bitmap format or a conversion process from the JPEG format to the PNG (Portable Network Graphics) format. It can be said that image data obtained by performing preprocessing on scan data is also image data generated by optically reading an original document. The preprocessing may be performed by another apparatus (for example, a server not shown in the drawings), instead of the processor 110 of the terminal apparatus 100. In this case, the processor 110 of the terminal apparatus 100 may acquire preprocessed image data (that is, the target image data) from the apparatus that performs preprocessing on the scan data.

(9) In each of the above-described embodiments, region data used for the compression process (specifically, the character region data indicative of the character region and the non-character region data indicative of the non-character region) indicates a corresponding region out of bitmap data obtained by decompressing the target image data (in the embodiment, the scan data obtained by JPEG compression). The region data may be data obtained by performing image process (referred to as "post-processing") on the corresponding region out of the target image data. For example, the post-processing may be an image quality adjustment process such as a tone curve adjustment and a white balance adjustment, or may be a process different from the image quality adjustment (for example, a color conversion process or a data format conversion process). Alternatively, such post-processing may be omitted, and the region data may indicate the corresponding region out of the target image data. Generally, the processor 110 of the terminal apparatus 100 may use, as the region data, various image data obtained by using the target image data. Specifically, the character region data may be various data indicative of a character region having characters out of the target image represented by the target image data. The non-character region data may be various data indicative of other-type region different from the character region out of the target image. In either case, the color value of the pixel represented by region data may be the same as the color value of the pixel at the same pixel position indicated by the target image data. Alternatively, the color value of the pixel represented by region data may be different from the color value of the pixel at the same pixel position indicated by the target image data.

(10) The apparatus that performs each of plurality of steps of the data process for performing character recognition while differentiating the character region and other-type region may be various apparatuses other than the apparatus described in the embodiments of FIGS. 2, 4, 5A, and 5B. For example, the server 300 may be omitted and, instead, the processor 110 of the terminal apparatus 100 may perform the character recognition process (for example, S160, S220, S225 in FIGS. 2, 4, 5A, and 5B). Further, the processor 210 of the scanner 200 may perform a part of the plurality of steps allocated to the terminal apparatus 100. For example, the processor 110 of the terminal apparatus 100 may perform only S300, S305 to generate a highly compressed PDF file, and the processor 210 of the scanner 200 may perform the remaining steps. Further, the terminal apparatus 100 may be omitted, and the processor 210 of the scanner 200 may perform all the steps allocated to the terminal apparatus 100. Further, the scanner 200 may be a multifunction peripheral having the reader 250, instead of a stand-alone scanner. Instead of the scanner 200, a digital camera configured to optically read an original document by shooting may be used. In this case, image data obtained by shooting the original document by the digital camera (referred to as "shot data") is used as target image data. Further, a terminal apparatus having a digital camera (for example, a smartphone) may perform all the steps allocated to the terminal apparatus 100 and all the steps allocated to the scanner 200.

(11) In the embodiments, the server 300 is a single computer, but the server 300 may be a so-called cloud server constituted by a plurality of computers connected such that the plurality of computers can communicate with one another.

In each of the above-described embodiments, a part of configurations realized by hardware may be replaced with software, and conversely, a part or entirety of configurations realized by software may be replaced with hardware. For example, the function of compressing region data may be realized by a dedicated hardware circuit.

When a part or entirety of the functions of this disclosure is realized by a computer program, the program may be provided in a form stored in a computer-readable storage medium (for example, a non-transitory storage medium). The program may be used in a state where the program is stored in the same or different storage medium (computer-readable storage medium) from the storage medium by which the program is provided. The "computer-readable storage medium" may include a portable storage medium such as a memory card and a CD-ROM, an internal memory such as various ROM, and an external storage device, such as a hard disk drive, connected to the computer.

What is claimed is:

1. A data processing apparatus comprising:
a processor; and
a memory storing instructions, the instructions, when executed by the processor, causing the processor to perform:
acquiring target image data that is generated by optically reading an original document;
acquiring, by using the target image data, character region data and other-type region data, the character region data being indicative of a character region representing characters, the other-type region data being indicative of an other-type region different from the character region;
generating first compressed data by performing a first compression process on the character region data;
acquiring first character-recognized data including first character information that is generated by performing a character recognition process on the first compressed data;
generating second compressed data by performing a second compression process on the other-type region data, the second compression process being different from the first compression process; and
acquiring second character-recognized data including second character information that is generated by performing the character recognition process on the other-type region data.

2. The data processing apparatus according to claim 1, further comprising a communication interface,
wherein the memory stores instructions, the instructions, when executed by the processor, causing the processor to perform:
transmitting the first compressed data, through the communication interface, to a server that performs the character recognition process;
transmitting the other-type region data to the server through the communication interface;
acquiring the first character-recognized data from the server through the communication interface; and
acquiring the second character-recognized data from the server through the communication interface.

3. The data processing apparatus according to claim 2, wherein the memory stores instructions, the instructions, when executed by the processor, causing the processor to perform:
determining a degree of congestion of a communication path to the server;
in response to determining that the degree of congestion is larger than a threshold value,
transmitting the first compressed data to the server, and acquiring the first character-recognized data from the server; and
in response to determining that the degree of congestion is smaller than the threshold value,
transmitting the character region data to the server, and acquiring third character-recognized data from the server, the third character-recognized data including third character information that is generated by performing the character recognition process on the character region data.

4. The data processing apparatus according to claim 2, wherein the memory stores instructions, the instructions, when executed by the processor, causing the processor to perform:
starting generating the first compressed data before starting acquiring the second character-recognized data.

5. The data processing apparatus according to claim 4, wherein the memory stores instructions, the instructions, when executed by the processor, causing the processor to perform:
transmitting the other-type region data to the server through the communication interface before starting generating the first compressed data.

6. The data processing apparatus according to claim 1, wherein the memory stores instructions, the instructions, when executed by the processor, causing the processor to perform:
generating combined data including the first compressed data, the second compressed data, the first character information, and the second character information.

7. The data processing apparatus according to claim 1, wherein the first compression process is a binarization process; and
wherein the second compression process is a resolution reduction process.

8. The data processing apparatus according to claim 1, wherein the memory stores instructions, the instructions, when executed by the processor, causing the processor to perform:
acquiring the target image data, through a network, from a reading apparatus that generates the target image data by optically reading the original document.

9. The data processing apparatus according to claim 1, further comprising:
a reader configured to generate the target image data by optically reading the original document.

10. The data processing apparatus according to claim 1, wherein the memory stores instructions, the instructions, when executed by the processor, causing the processor to perform:
identifying object regions in a scan image represented by the target image data;
classifying a plurality of pixels included in each of the object regions into background pixels having background color and object pixels other than the background pixels; and
determining, for each of the object regions, that an object region is the character region when a number of types of brightness values of the object region is smaller than a predetermined first threshold value and a ratio of the object pixels is smaller than a predetermined second threshold value, the ratio of the object pixels being obtained by dividing a number of the object pixels by a number of the background pixels, thereby determining whether the object region is the character region or the other-type region.

11. A non-transitory computer-readable storage medium storing a set of program instructions executable on a data processing apparatus, the set of program instructions comprising:
acquiring target image data that is generated by optically reading an original document;

acquiring, by using the target image data, character region data and other-type region data, the character region data being indicative of a character region representing characters, the other-type region data being indicative of an other-type region different from the character region;

generating first compressed data by performing a first compression process on the character region data;

acquiring first character-recognized data including first character information that is generated by performing a character recognition process on the first compressed data;

generating second compressed data by performing a second compression process on the other-type region data, the second compression process being different from the first compression process; and acquiring second character-recognized data including second character information that is generated by performing the character recognition process on the other-type region data.

12. The non-transitory computer-readable storage medium according to claim 11, wherein the set of program instructions further comprises:

transmitting the first compressed data, through a communication interface, to a server that performs the character recognition process;

transmitting the other-type region data to the server through the communication interface;

acquiring the first character-recognized data from the server through the communication interface; and acquiring the second character-recognized data from the server through the communication interface.

13. The non-transitory computer-readable storage medium according to claim 12, wherein the set of program instructions further comprises:

starting generating the first compressed data before starting acquiring the second character-recognized data.

14. The non-transitory computer-readable storage medium according to claim 13, wherein the set of program instructions further comprises:

transmitting the other-type region data to the server through the communication interface before starting generating the first compressed data.

15. The non-transitory computer-readable storage medium according to claim 12, wherein the set of program instructions further comprises:

determining a degree of congestion of a communication path to the server;

in response to determining that the degree of congestion is larger than a threshold value, transmitting the first compressed data to the server, and acquiring the first character-recognized data from the server; and in response to determining that the degree of congestion is smaller than the threshold value, transmitting the character region data to the server, and acquiring third character-recognized data from the server, the third character-recognized data including third character information that is generated by performing the character recognition process on the character region data.

16. The non-transitory computer-readable storage medium according to claim 11, wherein the set of program instructions further comprises:

generating combined data including the first compressed data, the second compressed data, the first character information, and the second character information.

17. The non-transitory computer-readable storage medium according to claim 11, wherein the first compression process is a binarization process; and wherein the second compression process is a resolution reduction process.

18. The non-transitory computer-readable storage medium according to claim 11, wherein the set of program instructions further comprises:

acquiring the target image data, through a network, from a reading apparatus that generates the target image data by optically reading the original document.

19. The non-transitory computer-readable storage medium according to claim 11, wherein the set of program instructions further comprises:

identifying object regions in a scan image represented by the target image data;

classifying a plurality of pixels included in each of the object regions into background pixels having background color and object pixels other than the background pixels; and determining, for each of the object regions, that an object region is the character region when a number of types of brightness values of the object region is smaller than a predetermined first threshold value and a ratio of the object pixels is smaller than a predetermined second threshold value, the ratio of the object pixels being obtained by dividing a number of the object pixels by a number of the background pixels, thereby determining whether the object region is the character region or the other-type region.

20. A data processing method comprising:

acquiring target image data that is generated by optically reading an original document;

acquiring, by using the target image data, character region data and other-type region data, the character region data being indicative of a character region representing characters, the other-type region data being indicative of an other-type region different from the character region;

generating first compressed data by performing a first compression process on the character region data;

acquiring first character-recognized data including first character information that is generated by performing a character recognition process on the first compressed data;

generating second compressed data by performing a second compression process on the other-type region data, the second compression process being different from the first compression process; and acquiring second character-recognized data including second character information that is generated by performing the character recognition process on the other-type region data.

* * * * *